United States Patent [19]

Breher

[11] 4,058,424
[45] Nov. 15, 1977

[54] METHOD OF AND DEVICE FOR PRODUCING IN A CONTINUOUS OPERATION ENDLESS DRIVING BELTS OF ANY DESIRED CIRCUMFERENTIAL LENGTH

[75] Inventor: Rudolf Breher, Porta Westfalica, Germany

[73] Assignee: BRECO Kunststoffverarbeitungs-GmbH & Co. KG, Porta Westfalica, Germany

[21] Appl. No.: 695,379

[22] Filed: June 14, 1976

[30] Foreign Application Priority Data

June 14, 1975  Germany .............................. 2526691

[51] Int. Cl.² ............................................. B29F 1/10
[52] U.S. Cl. .................................... 156/137; 156/140; 156/244; 156/245; 156/494; 156/500; 425/113; 425/115; 425/373
[58] Field of Search ............... 156/137, 138, 139, 140, 156/244, 245, 494, 500; 74/231 R, 231 P, 232, 233, 234, 237; 425/115, 363, 369, 370, 373, 113

[56] References Cited

U.S. PATENT DOCUMENTS

| | | | |
|---|---|---|---|
| 3,700,365 | 10/1972 | Spicer | 425/373 |
| 3,880,558 | 4/1975 | Breher et al. | 425/373 |
| 3,891,364 | 6/1975 | Muller | 425/373 |
| 3,973,894 | 8/1976 | Lindner et al. | 425/370 |

FOREIGN PATENT DOCUMENTS

7,008,343  3/1970  Japan .................................. 156/140

Primary Examiner—Caleb Weston
Attorney, Agent, or Firm—Walter Becker

[57] ABSTRACT

A method of producing in a continuous process an endless driving belt of any desired circumferential length of an extrudable synthetic material with a pull-resistant reinforcing insert extending in the longitudinal direction of the belt to be produced, according to which a mold chamber is formed between a rotatable molding wheel and an endless molding belt moving along a portion of the circumference of the molding wheel together with the latter. Liquid synthetic material is in a continuous manner and under pressure introduced into the sealed start of the mold chamber. The reinforcing insert is in a sealed manner likewise continuously introduced into the mold chamber while the reinforcing insert during the embedding thereof in the liquid synthetic material is up to the solidification of the synthetic material and prior to leaving the mold chamber supported at a radial distance from the surface of the molding wheel. When leaving the end of the mold chamber, the strand of synthetic material with the reinforcing insert therein is passed around a tensioning wheel spaced from the molding wheel by a distance adjusted in conformity with the desired circumferential length of the belt. The strand of synthetic material is during a simultaneous displacement in axial direction of the molding wheel by the width of the aforementioned strand returned to the molding wheel. The strand is then directly laterally adjacent the mold chamber with at least one portion of its width again introduced between the molding wheel and the molding belt while the mold chamber formed thereby is on that side thereof which faces the returned strand directly sealingly closed by the strand while the other side of the mold chamber is closed by the molding wheel and the molding belt. In a continuous manner at the start of the mold chamber, a new strand formed from introduced liquid synthetic material is injection molded onto that lateral surface of the returned strand which faces the mold chamber, the strand laterally closing the mold chamber.

12 Claims, 3 Drawing Figures

METHOD OF AND DEVICE FOR PRODUCING IN A CONTINUOUS OPERATION ENDLESS DRIVING BELTS OF ANY DESIRED CIRCUMFERENTIAL LENGTH

The present invention relates to a method of making in a continuous manner endless driving belts, especially tooth belts of any desired circumferential length from an extrudable synthetic material with a pull resistant reinforcing insert extending in the longitudinal direction of the belt. The invention also concerns a device for practicing said method.

One of the heretofore known methods of making tooth belts, especially endless tooth belts, with a reinforcing insert of wire, wire strand, or thread consists in winding the reinforcing wire onto a core of a casting mold, placing the mold core into a mold sleeve, and subsequently filling the hollow space in the mold with a liquid synthetic material or the like. Thereupon the thus formed hose section is cut into rings of the desired belt width. This method, however, among others, has the drawbacks that it is discontinuous and that it is difficult to remove the hose section from the mold core without causing permanent deformations to the hose section and in particular to the profile of the teeth.

German Offenlegungsschrift 2,216,948 describes a continuous method of making endless belts, according to which a longitudinally stretched-out insert carrier is continuously moved through a cylindrical mold. Within the mold, a reinforcing insert is continuously wound upon the insert carrier by which carrier the coiled reinforcing insert is carried through the mold. At the same time, liquid synthetic material is introduced into the mold in which the coiled reinforcing insert is embedded. After solidification of the synthetic material, the latter leaves the mold as reinforced hose from which after removal of the insert carriers, rings with the desired belt width can be cut off. This continuous pouring method has the additional drawback that with a molding tool only a certain belt size can be produced and that for each belt size a separate expensive mold tool is required. The above remarks also apply to the heretofore known method of making endless reinforced driving belts as it is described for instance in German Auslegeschrift 1,121,310 according to which first a reinforcing insert is in conformity with the extrusion method covered or enclosed by an extrudable synthetic material whereupon the thus enclosed reinforcing insert is wound on a winding core which is provided with teeth for forming a tooth belt while the windings are arranged closely adjacent to each other. The synthetic enclosures of the individual windings are fused to each other so that a reinforced hose-shaped article is obtained from which endless belts can be cut off. This winding method has the further drawbacks that no shrinkage compensation can be effected for compensating for the shrinking of the material which occurs during the cooling off of the synthetic material. A further drawback of this last mentioned winding method consists in that the enclosed or encased reinforcing inserts can during the winding up operation and when being pressed upon the winding core, be displaced in the still plastic synthetic enclosure of the synthetic material, so that precise uniform spacing of the individual reinforcing windings from each other and a precise location of the reinforcing inserts in the neutral zone of the driving belt cut off from the hose-shaped unit cannot be assured. Also the removal of the reinforced hose unit from the winding core is relatively difficult.

German Offenlegungsschrift 2,123,902 corresponding to U.S. Pat. No. 3,880,558—Breher issued Apr. 29, 1975 and belonging to the assignee of the present invention discloses a method for producing in a continuous process finite reinforced driving belts, according to which between a rotatable molding wheel and an endless belt partially looped around said wheel there is formed an arc-shaped hollow chamber in a mold. Liquid synthetic material is in a continuous process introduced under pressure into the sealed closed start of this hollow chamber, and up to the solidification of the synthetic material at the end of said hollow chamber, a post pressure is maintained in said hollow chamber to take care of the shrinkage of the material. Furthermore, likewise in a continuous manner at the start of said hollow chamber in the mold there is introduced a reinforcing insert in a sealed manner. This reinforcing insert is in said hollow chamber of said mold supported during the embedding in the liquid synthetic material up to the solidification thereof at a certain radial distance from the surface of the molding wheel. This method permits the continuous manufacture of high precision driving belts of any desired length, especially of tooth belts, with a reinforcing insert very firmly embedded in the synthetic material. Belt sections which can be cut off at any desired length are at their ends closed by fusing the synthetic material so as to obtain an endless driving belt of the desired circumferential length. The ends are provided with teeth and interconnected in such a way that the ends of the embedded reinforcing inserts which cannot be directly connected to each other overlap to a certain extent. The reinforcing insert the purpose of which consists in making the driving belt not extensible and to absorb the pulling forces occurring in the driving belt must at this overlapping area convey the forces from one end to the respective adjacent end and has to do this by the adherence of the reinforcing insert in the synthetic material and by the layer of synthetic material which is located between the said overlapping ends. Under normal temperature conditions, the pull resistance of endless belts produced according to the last mentioned method from finite belt sections is sufficient and high. Under high temperature conditions which may occur for instance with belts intended for cam shaft drives of internal combustion engines, however, the shear resistance of the synthetic material may no longer be sufficient so that the overlapping ends of the reinforcing insert become displaced relative to each other with the result that the driving belt lengthens.

It is, therefore, an object of the present invention to provide a method and device which will make it possible to produce high precision and endless driving belts with uninterrupted reinforcing insert and also to produce driving belts of different desired belt lengths.

These and other objects and advantages of the invention will appear more clearly from the following specification in connection with the accompanying drawings, in which.

According to the method of the present invention for producing in a continuous manner endless driving belts, especially tooth belts, of any desired circumferential length from an extrudable synthetic material with a pull resistant reinforcement extending in the longitudinal direction of the belt, the belt material is injection molded in a mold chamber which is formed between a rotatable molding wheel and an endless molding belt which moves along a portion of the circumference of the molding wheel together with the latter. The liquid synthetic material is in a continuous manner and under pressure introduced into the sealed start into said mold chamber, and the reinforcing insert is in a sealed manner likewise continuously introduced into said mold chamber while the reinforcing insert during the embedding thereof in the liquid synthetic material is up to the solidification of said synthetic material and prior to leaving said mold chamber supported at a radial distance from the surface of the molding wheel. The method according to the invention is characterized primarily in that the strand of synthetic material with reinforcing insert embedded therein is when leaving the end of said hollow chamber passed around a tensioning wheel which is spaced from said molding wheel by a distance which is adjusted in conformity with the desired circumferential length of the belt. The strand of synthetic material is during a simultaneous displacement in axial direction of the molding wheel by the width of said strand of synthetic material returned to the molding wheel. The returned strand of synthetic material is directly laterally adjacent said mold chamber with at least one portion of its width again introduced between the molding wheel and the molding belt, and the said mold chamber is on that side thereof which faces the returned strand of synthetic material directly sealingly closed by said strand of synthetic material while the other side of said molding chamber is closed by the molding wheel and the molding belt. In a continuous manner at the start of said mold chamber, a new strand of synthetic material formed from introduced liquid synthetic material is injection molded onto that lateral surface of the returned synthetic strand which faces said mold chamber, said strand of synthetic material laterally closing said mold chamber. As a result thereof, a reinforced hose is formed which rotates about the driven molding wheel and about the tensioning wheel and continuously moves on the molding wheel and the tensioning wheel in the axial direction thereof while rings of the respective desired belt width are cut off from said hose.

This method according to the present invention has the following advantages. In a continuous manner and as a semi-finished product for endless reinforced driving belts, a hose of synthetic material with embedded helical reinforcement can be produced and the circumferential length of the hose to be produced can in an extremely simple manner be dimensioned at will merely by changing the distance between the molding wheel and the dimensioning wheel. For instance when making tooth belts, it is possible with the same device to produce hoses of different dimensions and thus belts of different sizes, if for instance tooth belts are to be produced even those with a standard tooth pitch and standard tooth profile. While the hose to be produced during the continuous manufacture rotates continuously about the molding wheel and the tensioning wheel, it is possible to displace the hose by a slight force on the molding wheel and on the tensioning wheel in the axial direction thereof. Therefore the hose can in an effortless manner be continuously displaced in the axial direction of the molding wheel by a simple lateral deviation to that extent to which the hose continuously widens by a continuous molding on a strand of synthetic material within said mold chamber, and to the extent by which the respectively formed marginal portion of the hose leaving said mold chamber is laterally offset and is to be returned again to the start of the intermediate space between the molding wheel and the molding belt. The continuous widening of the hose is effected by molding of synthetic material in liquid condition so that a proper connection of the layers of synthetic materials which are helically placed against each other will be assured. Inasmuch as during the continuous molding on simultaneously also the reinforcing insert is supplied and is embedded into the liquid material of the respective molded on strand of synthetic material, also an optimum intimate connection between the reinforcing insert and the belt material, i.e., the synthetic material and another suitable extrudable material, is assured. The speed at which the molding wheel is driven and the speed at which the extrudable synthetic material is continuously conveyed to the start of the mold chamber, are coordinated with regard to each other in such a way that the synthetic material enters the mold chamber under pressure so that on one hand a complete filling in of the mold chamber will be assured and on the other hand a shrinkage compensation will be effected because of the fact that due to the prevailing post pressure, always a quantity of material is additionally pressed in which corresponds to the shrinkage of the solidifying synthetic material. In this way, an exact measurement precision of the completed product is assured.

The device according to the invention for practicing the above mentioned method according to the invention is characterized primarily in that the arc-shaped intermediate space between the molding wheel and the molding belt is closed along one side by means of a shoulder of the molding wheel shich shoulder carries the molding belt and sealingly cooperates with said molding belt, and is open along the other side over its entire radial cross section height. The device according to the invention furthermore comprises a tensioning wheel which is substantially axis parallel to the molding wheel which latter is connected to a drive and is spaced from the molding wheel by a distance which is variable in conformity with the desired circumferential length of the belt. A strand of synthetic material which is formed in the mold chamber and contains an embedded reinforcing insert and exits from the end of the arc-shaped intermediate space between the molding wheel and the molding belt is adapted to be passed around said tensioning wheel and is adapted in a circuit to return to the start of the arc-shaped intermediate space. Furthermore, according to the invention, the sealing member which at the start of the arc-shaped intermediate space sealingly cooperates with the molding wheel, the molding belt, and the shoulder of the molding wheel extends over a portion of the width of said intermediate chamber. Furthermore, the device according to the invention includes a deviating device by means of which the strand of synthetic material is during its return to the start of the intermediate chamber laterally displaceable in such a way that the returned strand of synthetic material at the start of the intermediate chamber is laterally offset by the width of the sealing member and sealingly engages that side of the sealing member which faces away from the shoulder of the molding wheel while the open side of the intermediate chamber is sealingly closed by the returned strand of synthetic material which has at least with a portion of its width again entered said intermediate chamber. The device according to the invention also comprises a cutting device by means of which from the hose-shaped unit produced by the helical molding to each other of reinforcement strands of reinforced strands of synthetic material, rings of the desired belt width can be cut off.

Figure 1:
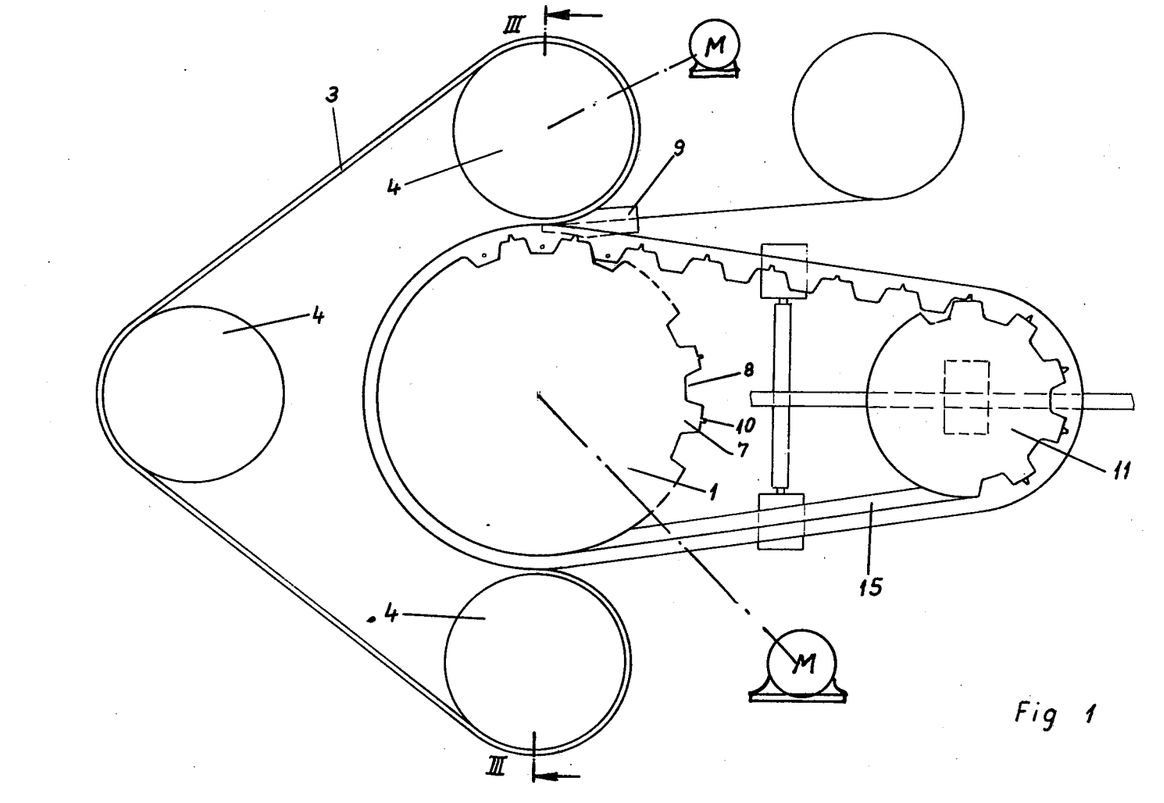
FIG. 1 is a diagrammatic side view of the device according to the present invention.
Figure 2:
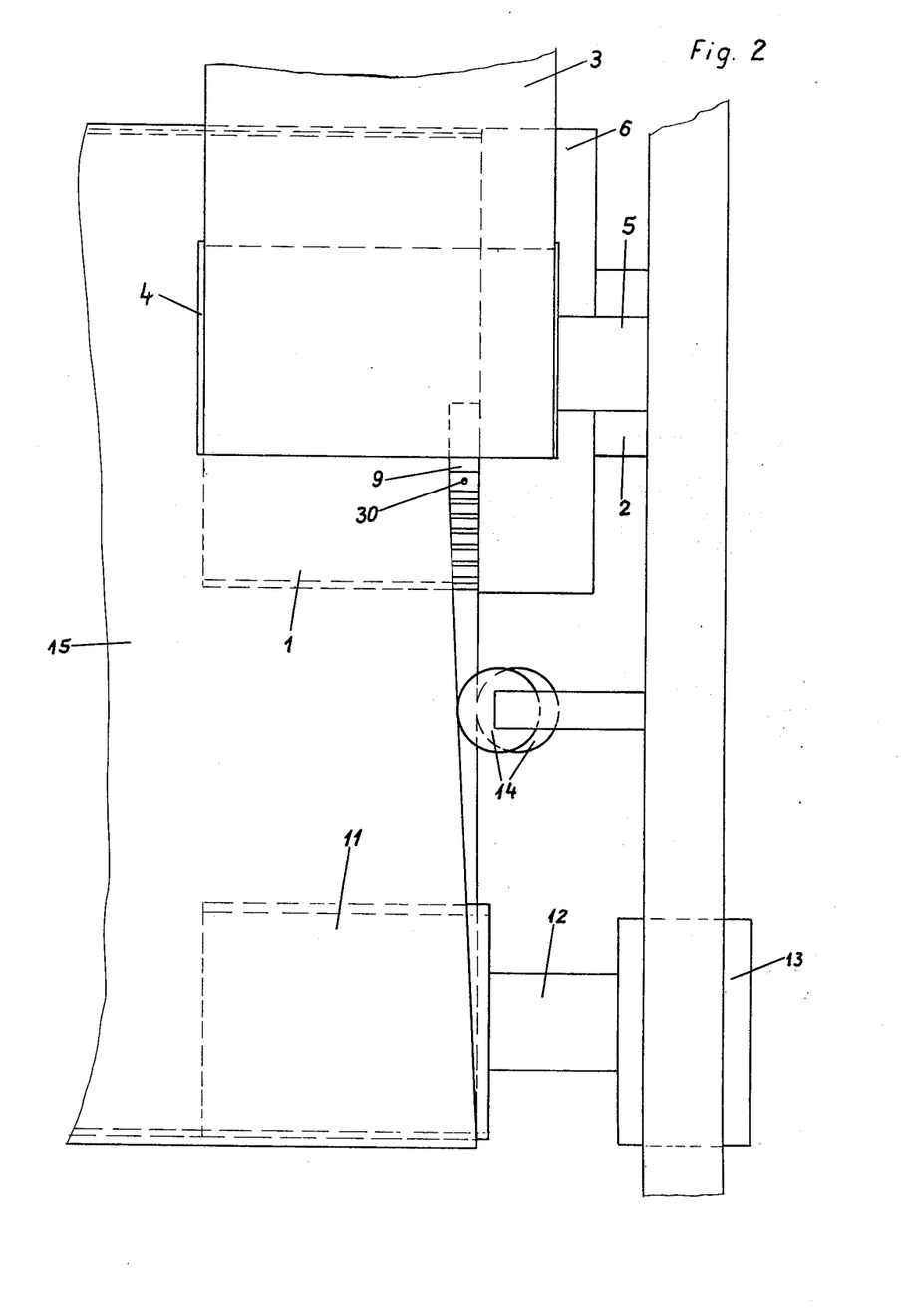
FIG. 2 shows in a simplified diagrammatic manner a top view of the device of FIG. 1.

Referring now to the drawings in detail, the device according to the invention comprises a molding wheel 1 which is rotatably journalled on a shaft 2 and is rotated by means of a drive (not shown in the drawing) of any standard type. An endless molding belt 3 is looped around a portion of the circumference of the molding wheel 1. The molding belt 3 moves together with the molding wheel 1 and passes about three deviating rollers 4 which are rotatably journalled on shafts 5. The molding wheel 1 has a disc-shaped shoulder 6 on which sealingly rests that portion of the molding belt which respectively is looped around the molding wheel. Adjacent the shoulder 6 there is provided a circumferential portion of the molding wheel 1 which circumferential portion has a shorter diameter than the shoulder 6. Said circumferentially smaller portion of the molding wheel 1 forms with the molding belt 3 an arc-shaped intermediate space. For purposes of producing a tooth profile of the tooth belt, said smaller circumferential portion of molding wheel 1 is alternately provided with teeth 7 and grooves 8 extending in the axial direction of the molding wheel. The molding belt 3 maintains a radial distance from the head surfaces of the teeth 7. The arc-shaped space formed between the molding wheel 1 and the molding belt 3 is along one side thereof closed by the shoulder 6 of wheel 1 which shoulder carries the molding belt and sealingly cooperates with the latter. The said intermediate space is along the other side open over its entire radial cross sectional height. At the start of the intermediate space which means at the place where the molding belt and the molding wheel are brought together, there is provided a sealing member 9 which in a sealing manner laterally engages the shoulder 6 while the molding belt 3 sealingly slides along the top side of said sealing member 9 while the bottom of said sealing member 9 sealingly cooperates with the circumference of the molding wheel. When the molding wheel 1 has a toothed circumferential surface, the sealing between the molding wheel and the sealing member 9 is effected by the fact that always at least one tooth 7 sealingly slides along the sealing member 9. As far as the teeth 7 are at their head surfaces provided with rib or fin-shaped winding noses 10, which will be explained further below, the teeth 7 by means of said winding noses 10 sealingly engage the sealing member 9 during their sliding operation. The sealing member 9 extends only over a portion of the width of the arc-shaped intermediate space formed between the molding wheel and the molding belt (see FIG. 2).

Arranged in spaced relationship to the molding wheel 1 is a tensioning wheel 11 which is rotatably journalled on a shaft 12 which latter extends parallel to the axle 2 of the molding wheel 1. The axle 12 is arranged on a displaceable holding means 13. By displacing the holding means 13 by means of an adjusting device not illustrated in detail, the distance between the axle 12 of the tensioning wheel 11 and the axle 2 of the molding wheel 1 can be varied. Between the molding wheel 1 and the tensioning wheel 11 there is provided a deviating device comprising rollers 14 which device is adjustable by means of a non-illustrated adjusting device in an axial direction of the molding wheel 1. The above mentioned adjusting devices may be of any standard type.

Figure 3:
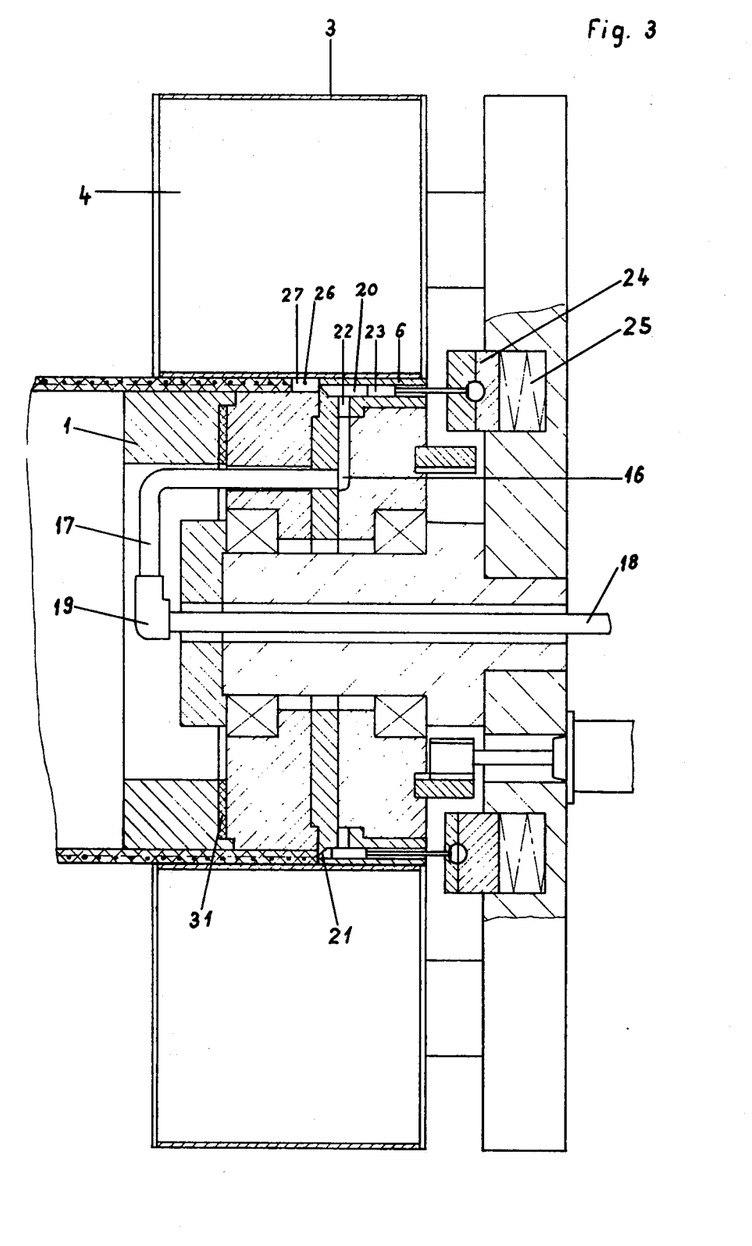
FIG. 3 represents a section through a preferred specific design of the device according to the invention, in particular of the molding wheel, said section being taken along the line III—III of FIG. 1.

The operation of the device according to the invention is as follows: First the distance between the axle 5 of the molding wheel 1 and the axle 12 of the tensioning wheel 11 is adjusted in conformity with the desired circumferential belt length of the driving belt to be produced. This may for instance be effected in such a way that an endless master or sample belt which has precisely the desired circumferential belt length of the driving belt to be made is pressed upon the molding wheel and the tensioning wheel and then by displacement of the holding means 13, the tensioning wheel 11 is spaced from the molding wheel 1 to such an extent that the master belt will tautly be looped around the molding wheel and the tensioning wheel. A wire or thread-like reinforcing insert is through an inlet passage 30 of the sealing member 9 threaded into the space between the molding wheel 1 and the molding belt 3 and is in the form of at least one winding passed around the molding wheel and the tensioning wheel. Thereupon, the molding wheel 1 is located and the molding wheel also advances the molding belt while the molding wheel takes along the threaded in start of the reinforcing insert. Simultaneously, the introduction of liquid synthetic material into the start of the space between the molding wheel 1 and molding belt 3 is started. The introduction of the liquid synthetic material may, if desired, be effective also through the sealing member 9 for instance together with the reinforcing insert through the inlet passage 30. Advantageously, at the start of the introduction of liquid synthetic material, the above mentioned master belt is placed upon the molding wheel 1 to such an extent that said master belt engages a sealing member 9 and along the molding belt closes the open side thereof. As a result thereof, from the end of said arc-shaped intermediate space, there exits the start of a formed strand of synthetic material which has a reinforcing insert embedded therein and which also already at that side thereof which faces away from the shoulder 6 of the molding wheel 1 has a straight rim, and the width of which practically corresponds to the width of the sealing member 9. This start of the formed strand of synthetic material is at the exit end of the intermediate space lifted off by the molding wheel 1 from the threaded in leading start of the reinforcing insert and is passed around the tensioning wheel 11 and at the start of the intermediate space is returned between the molding wheel and molding belt 3. During this return movement, the formed strand of synthetic material is by the corresponding set deviating device 14 laterally displaced to such an extent that at the returned strand of synthetic material directly laterally adjacent the mold chamber proper the start of which is closed by the sealing member 9, again enters the space between the molding wheel and the molding belt, and laterally engages the sealing member 9. By means of this strand of synthetic material which is returned into the intermediate space and cooperates in a sealing manner with the molding wheel and the molding belt, the molding chamber proper is closed at its open side. While the returned strand of synthetic material passes through the intermediate space, the next winding of the continuously formed strand of synthetic material is molded onto that lateral surface of said strand which faces the mold chamber. This is effected by a continuous introduction of liquid synthetic material and of a reinforcing insert into the mold chamber. This next winding will after return about the tensioning wheel 11 to the start of the intermediate chamber take over the lateral sealing of the mold chamber while the lateral molding-on operation of further windings of the strand of synthetic material is repeated. In this way, a hose is formed which has an embedded helical reinforcing insert and rotates about the mold wheel 1 and the tensioning wheel 11. In this connection, the hose is advanced on the molding wheel 1 and tensioning wheel 11 in the axial direction thereof to such an extent as continuously a newly formed strand of synthetic material is molded onto that rim of the hose which faces the shoulder 6 of the molding wheel 1. From the thus formed hose, by means of a not further illustrated cutting device of any strandard type, rings are cut off which have the desired width of the driving belt. By means of the variable distance between the molding wheel and the tensioning wheel, it is possible to determine the diameter of the hose being formed so that in this way by means of one and the same device, it is possible to produce endless driving belts of any desired belt circumferential length. The distance between the individual reinforcing inserts of a driving belt may under certain circumstances be rather short. In such an instance, the sealing member 9 which contains the inlet passage 30 for the reinforcing insert may become too narrow in order to be able in addition to the reinforcing insert also to introduce the still liquid synthetic material through the sealing member into the start of the mold chamber. For such an instance, FIG. 3 shows a particular example of the molding wheel 1 with which the liquid synthetic material is from the interior of the molding wheel conveyed to the start of the mold chamber. FIG. 3 shows the molding wheel 1 with the disc-shaped shoulder 6 on which rests the molding belt 3 passed around the deviating rollers 4.

The hose shaped unit which is formed by the continuous formation of a reinforced strand of synthetic material is designated with the reference numeral 15. This hose-shaped unit exits from the intermediate space (located at the lower end of the intermediate space between molding wheel 1 and molding belt 3) —see FIG. 3— and is laterally displaced by a distance which corresponds to the width of the sealing member or width of the strand of synthetic material molded laterally onto the hose in a continuous manner. Said strand of synthetic material again enters the start of the intermediate space between the molding wheel and the molding belt and thus continuously forms a mold chamber between the rim of the hose and the forming wheel shoulder 6. The liquid synthetic material and the reinforcing insert are continuously introduced into said mold chamber. The molding wheel has an annular passage 16 which by means of a pipeline 17 is connected to a stationary feeding line 18 which centrally extends through the molding wheel 1. The feeding line 18 is equipped with a head piece 19 which is rotatably arranged on the feeding line 18 so that the pipeline 17 is able together with the molding wheel 1 to rotate about the stationary feeding line 18. The molding wheel illustrated in FIG. 3 is intended for producing tooth belts and therefore has the grooves 8 illustrated in FIG. 1. At each groove 8, the molding wheel 1 has a cylinder 20 which extends parallelly with regard to the molding wheel axle. The cylinder 20 has an exit opening 21 which leads into the pertaining groove 8 and by means of a radial inlet opening is connected to the annular passage 16. In each cylinder 20 there is displaceably arranged a piston 23 which protrudes from the lateral surfaces of the molding wheel 1 and is in engagement with a stationary annular control cam 24. For instance, the piston may at its protruding end be provided with a ball head which slides along in a correspondingly shaped groove of the control cam 24. By means of the control cam 24, each piston 23 is during the rotation of the molding wheel 1 displaced in the cylinder 20. The control cam 24 is so designed that each piston can be retracted and the cylinder inlet opening 22 can be opened as soon as the cylinder of this piston and the groove 8 pertaining thereto and forming part of the molding wheel has entered the region of the arc shaped intermediate chamber between the molding wheel and the molding belt, so that liquid synthetic material from the annular passage 16 can by the cylinder 20 be introduced and pressed into the molding wheel 8 and can be introduced also into the start of the closed molding chamber. With those cylinders 20 the molding wheel grooves 8 of which are located outside the arc region of the intermediate chamber between the molding wheel and the molding belt, in other words, are not covered by the molding belt, the pistons 23 are by the control cam displaced to such an extent that the cylinder opening 22 is covered by the piston and closed and consequently no liquid synthetic material can enter from the annular passage 16 into the cylinder 20. Furthermore, the pistons 23 may be employed to generate during the solidification of the synthetic material in the mold chamber, a post-pressure required for the shrinkage compensation. To this end, the control cam 24 is so designed that the respective pistons located within the region of the arc-shaped intermediate chamber are not only displaced up into the position in which the close the cylinder inlet openings 22 but are displaced even somewhat further beyond that position in order to expel that quantity of liquid synthetic material from the cylinder 20 which is required for the shrinkage compensation of the solidifying material. In order to make sure that in this connection no pressure will occur which is so high that the synthetic material is squeezed out for instance between the molding belt 3 and the molding wheel shoulder 6, the control cam 24 by means of a spring device 25 is journalled resiliently. The spring force of this spring device 25 is greater than the post pressure to be produced by the piston for the shrinkage compensation but is less than that pressure which is conveyed to the piston 23 would result in an undesired squeezing out of synthetic material from the mold chamber.

The reinforcing insert which is illustrated in FIG. 3 with the reference numeral 26 and which is continuously drawn into the molding chamber 27 shown in FIG. 3 is wound onto the already mentioned winding noses 10. By means of these winding noses 10, the reinforcing insert is so supported that it is located precisely at the desired spot for instance in the neutral zone of the finished driving belt which latter is cut off from the manufactured hose shaped unit. Furthermore, the reinforcing insert is by means of said winding noses held in spaced relationship to the head surface of the teeth 7 of molding wheel 1 so that the reinforcing insert, with the exception of the nearly point-shaped contact spot between the reinforcing insert and winding nose is completely embedded in the synthetic material.

Expediently, the device according to the invention may be so designed that the molding wheel 1 has an insulating disc 31 and in the region of the mold chamber adjacent the molding wheel shoulder 6 is equipped with a heating means and within the region of the open side of the intermediate chamber between the molding wheel and the molding belt is equipped with cooling means. For purposes of aiding the thus obtained advantageous effect during the continuous manufacture of the hose-shaped unit, furthermore the upper reversing roller 4 shown in FIG. 3 or also in addition thereto the lower deviating roller 4 have a heated left hand longitudinal section and a cooled right hand longitudinal section.

With the design according to FIG. 3, expediently the outlet openings 21 of the cylinder 20 are so narrowly designed that at the lateral surface of each tooth formed in a molding wheel groove 8 and pertaining to the strand of synthetic material which is formed continuously in the mold chamber, a so-called point gate is formed. These point gates have the advantage that the formed strand of synthetic material which exits from the end of the mold chamber separates easier and better from the quantity of synthetic material which is still in the cylinders 20, when the formed strand of synthetic material is during its exit from the mold chamber lifted off from the molding wheel.

It is, of course, to be understood that the present invention is, by no means, limited to the specific showing in the drawings, but also comprises any modifications within the scope of the appended claims.

What I claim is:

1. A device for producing in a continuous manner endless driving belts of any desired circumferential length and of extrudable synthetic material with a pull-resistant reinforcing insert extending in the longitudinal direction of the belt to be produced, which includes: a rotatable molding drum provided with a cylindrical shoulder arranged at one end of said drum and having a diameter slightly greater than the remainder of said drum, a molding belt movable over a circumferential section of said drum in radially spaced relationship thereto so as to confine therewith arc-shaped molding chamber means with inlet and outlet sections while sealingly engaging the peripheral surface of said shoulder to close only one side of said molding chamber means, the other side of said molding chamber means being open, inlet means for synthetic material and inlet means for the pull-resistant reinforcing insert arranged at said inlet section of said molding chamber means, a tensioning wheel arranged in axis parallel spaced relationship to said molding drum and adjustable relative to said drum, sealing means sealingly engaging at said inlet section said molding drum and said shoulder and said molding belt, said sealing means extending over a portion of said molding chamber means in the axial direction of said drum, deviating means interposed between said drum and said tensioning wheel and operable to laterally displace a belt strip leaving said outlet section and passing from said drum over said tensioning wheel back to said drum and said inlet section so that said belt strip again enters said molding chamber means offset in axial direction of said drum by the width of said sealing means and sealingly engages that side of said sealing means which faces away from said shoulder while the open side of said molding chamber means is sealingly closed by the respective last returned belt strip, said synthetic material and reinforcing insert being formed into a continuous formation of a reinforced strand of synthetic material finally being adapted to be cut into rings by suitable standard cutting means.

2. A device for producing in a continuous manner endless driving belts of any desired circumferential length and of extrudable synthetic material with a pull-resistant reinforcing insert extending in the longitudinal direction of the belt to be produced, which includes: a rotatable molding drum provided with a cylindrical shoulder arranged at one end of said drum and having a diameter slightly greater than the remainder of said drum, a molding belt movable over a circumferential section of said drum in radially spaced relationship thereto so as to confine therewith arc-shaped molding chamber means with inlet and outlet sections while sealingly engaging the peripheral surface of said shoulder to close one side of said molding chamber means, the other side of said molding chamber means being open, inlet means for synthetic material and inlet means for the pull-resistant reinforcing insert arranged at said inlet section of said molding chamber means, a tensioning wheel arranged in axis parallel spaced relationship to said molding drum and adjustable relative to said drum, sealing means sealingly engaging at said inlet section said molding drum and said shoulder and said molding belt, said sealing means extending over a portion of said molding chamber means in the axial direction of said drum, deviating means interposed between said drum and said tensioning wheel and operable to laterally displace a belt strip leaving said outlet section and passing from said drum over said tensioning wheel back to said drum and said inlet section so that said belt strip enters said molding chamber means offset in axial direction of said drum by the width of said sealing means and sealingly engages that side of said sealing means which faces away from said shoulder while the open side of said molding chamber means is sealingly closed by the respective last returned belt strip, said synthetic material and reinforcing insert being formed into a continuous formation of a reinforced strand of synthetic material finally being adapted to be cut into rings by suitable standard cutting means, said deviating means including guiding means for engaging the upper and the lower half of the belt strip coming from said outlet section of said molding chamber means and being returned to said inlet section of said molding drum and for imparting upon said belt strip deviation toward that side of said molding chamber means which is open prior to the belt strip being returned entering said molding chamber means.

3. A device according to claim 2, in which said sealing means includes an inlet conduit for the introduction of a single wire-shaped reinforcing insert, said deviating means being so adjustable that the lateral deviation of the returning belt strip corresponds to the desired distance between the individual reinforcing insert windings in the finished belt, the width of said sealing means being so dimensioned as to sealingly fill the gap between said shoulder and the laterally offset belt strip returned to said molding chamber means.

4. A device for producing in a continuous manner endless driving belts of any desired circumferential length and of extrudable synthetic material with a pull-resistant reinforcing insert extending in the longitudinal direction of the belt to be produced, which includes: a rotatable molding drum provided with a cylindrical shoulder arranged at one end of said drum and having a diameter slightly greater than the remainder of said drum, a molding belt movable over a circumferential section of said drum in radially spaced relationship thereto so as to confine therewith arc-shaped molding chamber means with inlet and outlet sections while sealingly engaging the peripheral surface of said shoulder to close one side of said molding chamber means, the other side of said molding chamber means being open, inlet means for synthetic material and inlet means for the pull-resistant reinforcing insert arranged at said inlet section of said molding chamber means, a tensioning wheel arranged in axis parallel spaced relationship to said molding drum and adjustable relative to said drum, sealing means sealingly engaging at said inlet section said molding drum and said shoulder and said molding belt, said sealing means extending over a portion of said molding chamber means in the axial direction of said drum, deviating means interposed between said drum and said tensioning wheel and operable to laterally displace a belt strip leaving said outlet section and passing from said drum over said tensioning wheel back to said drum and said inlet section so that said belt strip enters said molding chamber means offset in axial direction of said drum by the width of said sealing means and sealingly engages that side of said sealing means which faces away from said shoulder while the open side of said molding chamber means is sealingly closed by the respective last returned belt strip, said synthetic material and reinforcing insert being formed into a continuous formation of a reinforced strand of synthetic material finally being adapted to be cut into rings by suitable standard cutting means, said molding drum having its periphery provided alternately with tooth and groove spaces, each groove space being provided with an injection conduit for a liquid synthetic material and leads to common conduit feeding means arranged in said drum and connectable to a source of liquid synthetic material, valve means operable from the outside of said drum and respectively associated with each of said injection conduits, and control means responsive to the rotation of said drum to open the respective valves pertaining to the respective injection conduits located in the arc range of the respective molding chamber section receiving the respective last returning belt strip while closing the respective valves located outside said last mentioned molding chamber section.

5. A device according to claim 4, in which said injection conduits lead into said groove spaces at said shoulder and comprise an exit designed as a restricted gating.

6. A device according to claim 4, which includes: heating means for heating said drum within the region of that side of said molding chamber means which is closed by said drum shoulder, and cooling means for cooling that side of said molding chamber means which is located within the region of that molding chamber means which is closed by the respective last returned belt strip.

7. A device according to claim 4, in which each of said valves includes a cylinder arranged in said molding drum in axis parall manner to the axis of said molding drum and also includes a piston reciprocable in said cylinder, each of said cylinders respectively being provided with outlet openings respectively leading into said groove spaces and also respectively being provided with radial inlet openings respectively connected to said common feeding conduit means, said device also including a stationary annular cam, said pistons projecting from the lateral surfaces of said drum and engaging said cam, said cam being operable to bring about closing and opening of said radial inlet bores in response to said pistons sliding on said cam during rotation of said drum.

8. A device according to claim 7, in which said cam has an ascending section arranged within the arc region of the molding chamber means and being so designed that a piston advancing during rotation of said drum in the respective arc region of said molding chamber means prior to the end of said arc region having been reached has moved beyond the piston position covering and blocking said inlet openings and has done so by a predetermined distance while displacing liquid synthetic material from said cylinder.

9. A method of producing in a continuous process endless driving belts of any desired circumferential length and of an extrudable synthetic material with a pull-resistant reinforcing insert material extending in the longitudinal direction of the belt to be produced, which includes the steps of: creating an arc-shaped molding chamber between a molding drum and a section of an endless molding belt cooperating with an arc-shaped circumferential section of said molding drum while continuously rotating said molding drum together with said molding belt, sealingly closing the start of the molding chamber having an entrance opening, continuously feeding extruded synthetic material under pressure and reinforcing insert material into the sealingly closed start of said molding chamber to provide a strip of synthetic material having embedded therein said reinforcing insert material while supporting said reinforcing insert material at a radial distance from the peripheral surface of said molding drum until the solidification of said strip having two lateral surfaces in said molding chamber and prior to leaving the end of said molding chamber, reversing said solidified strip after leaving said molding chamber around a tensioning wheel adjustably distanced from said molding drum back to said molding drum while simultaneously displacing said strip in axial direction of said molding drum by the width of said strip, introducing the reversed strip between said molding drum and said section of said endless molding belt directly laterally adjacent said molding chamber and sealingly closing by the introduced strip only the open arc-shaped side of said molding chamber facing said introduced strip while sealingly closing the other arc-shaped side of said molding chamber by the cooperating sections of said molding drum and said molding belt, molding onto that one of the two lateral surfaces of said introduced strip which faces said molding chamber, in an uninterrupted manner a new strip formed from extruded synthetic material and reinforcing insert material fed into said molding chamber, and repeating the thus described steps until a hose has been built which rotates around said molding drum and said tensioning wheel while simultaneously moving on said molding drum and said tensioning wheel in the axial direction thereof, and cutting the thus obtained hose with the helically arranged reinforcing insert material embedded therein into belts of the desired width.

10. A method according to claim 9, which includes the steps of: sealing the entrance opening of said molding chamber and feeding both the reinforcing insert material and the synthetic material together through the thus created seal.

11. A method according to claim 9, which includes the steps of: sealing the entrance opening of said molding chamber and feeding a single wire-shaped reinforcing insert material through the thus created seal, prior to introducing said reversed strip between said molding drum and said section of said endless molding belt displacing said reversed strip in axial direction of said molding drum by a distance which corresponds to the desired distance between the individual reinforcing insert windings in the finished belt, feeding the synthetic material separately into said molding chamber from the interior of said molding drum, and during the rotation of said molding drum and in a self-acting manner closing the exit openings on the peripheral surface of said molding drum for the synthetic material prior to leaving the arc range of said molding chamber and opening said exit openings after re-entrance into said arc range of said molding chamber.

12. A method according to claim 9, which includes the steps of: preparing a master belt of the desired circumferential length of the belt to be produced, inserting the master belt between said molding drum and said section of said endless molding belt and closing by said master belt said open arc-shaped side of said molding chamber, placing said master belt on said tensioning wheel and distancing said tensioning wheel from said molding drum until taut condition of said master belt, and while rotating said molding drum together with said master belt molding the start of a strip of synthetic material together with the start of a reinforcing insert material onto a lateral portion of said master belt.

* * * * *